(12) United States Patent
Giacomella

(10) Patent No.: US 11,455,446 B2
(45) Date of Patent: Sep. 27, 2022

(54) ELECTRIC CIRCUITS DRAFTING METHOD

(71) Applicant: TEXA S.p.A, Monastier di Treviso (IT)

(72) Inventor: Mario Giacomella, Monastier di Treviso (IT)

(73) Assignee: Texa S.p.A, Monastier di Treviso (IT)

( * ) Notice: Subject to any disclaimer, the term of this patent is extended or adjusted under 35 U.S.C. 154(b) by 117 days.

(21) Appl. No.: 16/742,998

(22) Filed: Jan. 15, 2020

(65) Prior Publication Data

US 2020/0226312 A1 Jul. 16, 2020

(30) Foreign Application Priority Data

Jan. 15, 2019 (IT) .................. 102019000000625

(51) Int. Cl.
*G06F 30/31* (2020.01)
(52) U.S. Cl.
CPC .................................. *G06F 30/31* (2020.01)
(58) Field of Classification Search
CPC ...... G06F 30/31; G06F 30/39; G06F 2111/12; G06F 2111/20
See application file for complete search history.

(56) References Cited

U.S. PATENT DOCUMENTS

| | | | | |
|---|---|---|---|---|
| 5,623,418 A | | 4/1997 | Rostoker et al. | |
| 6,606,731 B1 * | | 8/2003 | Baum ................ | G06K 9/00476 716/103 |
| 6,738,957 B2 * | | 5/2004 | Gont ...................... | G06F 30/30 716/102 |
| 6,766,331 B2 * | | 7/2004 | Shema ..................... | G06F 16/94 |
| 7,212,936 B2 * | | 5/2007 | Baum ..................... | G06F 30/18 702/92 |
| 7,802,221 B1 * | | 9/2010 | Brink ...................... | G06F 30/30 716/121 |
| 7,831,948 B2 * | | 11/2010 | Boose ..................... | G06F 30/15 716/139 |

(Continued)

FOREIGN PATENT DOCUMENTS

EP 0847022 6/1998

OTHER PUBLICATIONS

Burch "Logisim—A Graphical Tool for Designing and Simulating Logic Circuits", Web Archive, 2 P., Nov. 6, 2018.

(Continued)

*Primary Examiner* — Nha T Nguyen

(57) ABSTRACT

Described is a method for drafting and displaying electrical circuits based on libraries containing items or speech codes corresponding to the various types of electrical components, the items are made up of alphanumeric codes through which it is possible to unequivocally identify each single electrical component and the method comprises the steps of viewing on a PC screen a control unit of the electrical circuit in the middle of a work area, viewing on the PC screen further electrical components, connected directly or indirectly to the control unit, around the above-mentioned control unit, grouping the views according to a level structure, where each level represents a component or device and contains a structure of sub-levels, setting and grouping a plurality of components or devices which have to be highlighted with respect to others, through graphic animations on the PC screen.

7 Claims, 2 Drawing Sheets

(56) References Cited

U.S. PATENT DOCUMENTS

Figure 1:
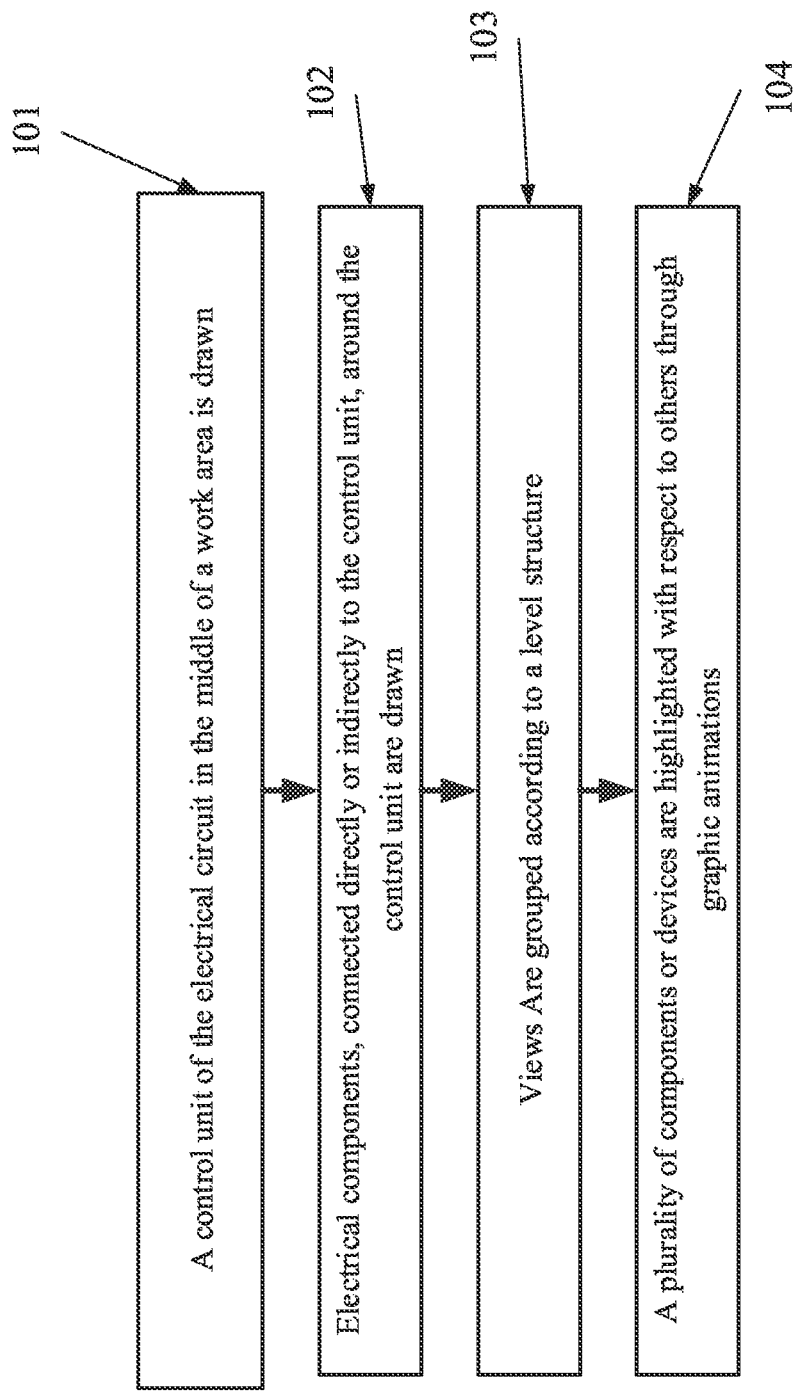

| | | | | |
|---|---|---|---|---|
| 7,990,375 B2* | 8/2011 | Kohli | ............... | G06F 30/30 345/419 |
| 8,214,789 B2* | 7/2012 | Boose | ............... | G06F 30/00 716/139 |
| 8,347,242 B2* | 1/2013 | Boose | ............... | G06F 30/39 716/103 |
| 8,407,645 B1* | 3/2013 | Caranci | ............... | G06F 30/30 716/126 |
| 8,539,432 B2* | 9/2013 | Orita | ............... | G06F 30/394 716/137 |
| 8,862,998 B2* | 10/2014 | Arquie | ............... | G06F 3/0484 715/736 |
| 9,105,120 B2* | 8/2015 | Shimoyama | ............... | G06T 11/001 |
| 9,165,100 B2* | 10/2015 | Begur | ............... | G06K 9/00476 |
| 9,645,715 B1* | 5/2017 | Jain | ............... | G06F 30/367 |
| 9,658,271 B2* | 5/2017 | Thomas | ............... | G01R 31/086 |
| 10,078,714 B2* | 9/2018 | Peixoto | ............... | G06F 30/30 |
| 10,417,355 B1* | 9/2019 | Torgerson | ............... | G06F 3/04845 |
| 10,467,370 B1* | 11/2019 | Kukal | ............... | H05K 3/0005 |
| 10,528,688 B1* | 1/2020 | Pal | ............... | G06F 30/3312 |
| 10,586,011 B1* | 3/2020 | Nagle | ............... | G06F 30/31 |
| 10,678,978 B1* | 6/2020 | Kukal | ............... | G06F 30/337 |
| 10,699,051 B1* | 6/2020 | Zhang | ............... | G06F 30/392 |
| 10,719,642 B2* | 7/2020 | Karnia | ............... | G06F 30/30 |
| 10,719,650 B1* | 7/2020 | Sanders | ............... | G06F 30/39 |
| 10,997,332 B1* | 5/2021 | Kukal | ............... | G06F 30/30 |
| 11,067,598 B2* | 7/2021 | Machimura | ............... | G01R 31/2803 |
| 2002/0194190 A1* | 12/2002 | Shema | ............... | G06F 16/94 |
| 2003/0025734 A1* | 2/2003 | Boose | ............... | G06T 11/60 715/765 |
| 2003/0074164 A1* | 4/2003 | Simmons | ............... | F24F 11/00 703/1 |
| 2004/0055006 A1* | 3/2004 | Iwamura | ............... | H04N 21/4312 725/37 |
| 2005/0268269 A1* | 12/2005 | Coiley | ............... | G06F 30/31 716/113 |
| 2008/0082948 A1* | 4/2008 | Boose | ............... | G06F 3/0238 716/119 |
| 2008/0234986 A1* | 9/2008 | Chen | ............... | G06F 30/30 703/1 |
| 2011/0029905 A1* | 2/2011 | Kodaganur | ............... | G06F 8/10 715/765 |
| 2011/0035723 A1* | 2/2011 | Kodaganur | ............... | G06F 8/34 717/105 |
| 2014/0229426 A1* | 8/2014 | Gootee, III | ............... | G06F 30/13 707/608 |
| 2015/0161301 A1* | 6/2015 | Begur | ............... | G06F 30/327 716/105 |
| 2016/0110369 A1* | 4/2016 | Cervelli | ............... | G06F 16/248 707/722 |

OTHER PUBLICATIONS

Burch "Logisim: A Graphical System for Logic Circuit Design and Simulation", Journal on Educational Resources in Computing, JERIC, 2(1): Mar. 5-16, 2002.

* cited by examiner

ELECTRIC CIRCUITS DRAFTING METHOD

RELATED APPLICATIONS

This application claims the benefit of priority of Italian Patent Application No. 102019000000625 filed on Jan. 15, 2019, the contents of which are incorporated herein by reference in their entirety.

This invention relates to a procedure for representing electric circuits.

In particular, the invention relates to an innovative method of organization and drafting of interactive electric diagrams, based on libraries, databases or data collections.

The electric diagrams consist in a simplified representation of electric or electronic circuits by using conventional symbols. They can contain, as well as the devices and the connections which make up the circuit, also information concerning the parameters which characterize them, for example details on the voltage or current intensity, as well as the waveforms of the circuit signals.

It is known how important these diagrams are in the design and maintenance of electric or electronic circuits and devices, both in the industrial and civil sector, due to their capacity to document in a clear, unequivocal and effective manner the features of said circuits. In fact, it is possible, simply by consulting the diagrams, to know all the fundamental characteristics of a circuit, regardless of the complexity of their elements and/or their mutual connections.

However, it is evident how one of the fundamental characteristics of electric diagrams is the quality and clarity of their graphical representation and drafting, as this directly affects the possibility of interventions for maintenance purposes or following faults and malfunctions.

Electric diagrams are currently prepared on computers using graphics processing software, and they can be specifically transferred on license to the users by the specialist production companies.

The aims of the invention include:
- providing a method for representing electric diagram's which is simpler and more intuitive to consult;
- providing a method for drafting electric diagrams which is more convenient to achieve, using graphics processing software which is accessible to a wider range of users;
- providing a method for drafting electric diagrams which is innovative due to the optimized reading features.

These and other aims are achieved by a method for representing electric diagrams according to claim 1; further technical details ad features are indicated in the dependent claims.

The invention is now described, by way of example and without limiting the scope of the invention, according to a preferred embodiment.

Advantageously, the proposed method is based on the use of already existing libraries, which can items, or speech codes, corresponding to the various types of electrical components, such as, for example, sensors, actuators and control units, which form part of the specific sector of interest, for example design and engineering. These libraries can be added to and/or modified over time with new items, corresponding to updating with new technologies or functions to be used.

Said items consist of alphanumeric codes by which it is possible to identify in an unequivocal and advantageous manner each single device (for example, X0 for a plug), which can therefore be used in various work environments simply by referring to its code. If there are several devices of the same type, they are differentiated by adding an incremental numerical suffix to the code (for example, X0-1, X0-2, X0-3 . . . ).

Figure 2:
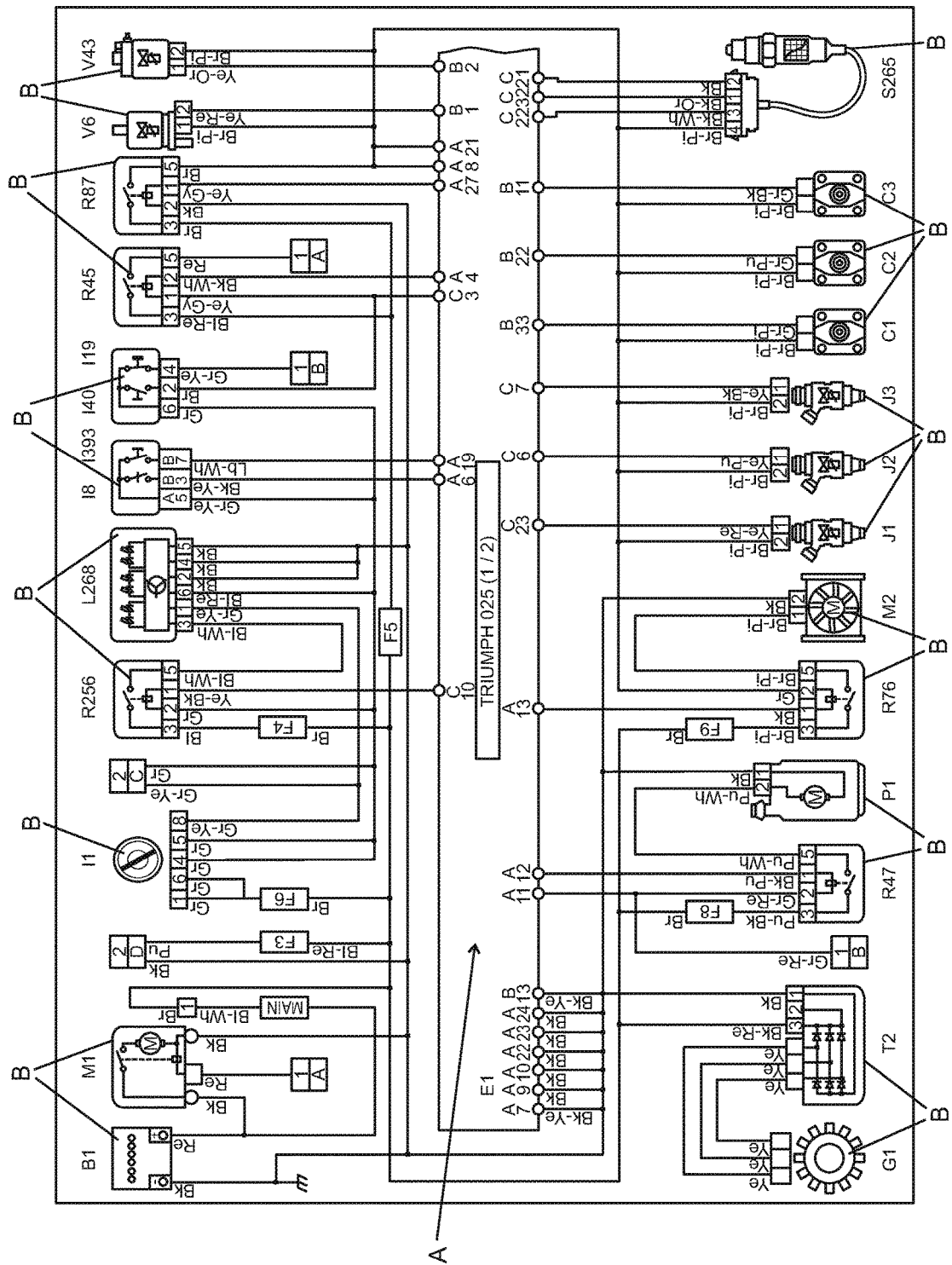

Reference is now made to FIG. 1, which is a method for drafting and displaying electrical circuits based on libraries containing items or speech codes corresponding to the various types of electrical components, according to some embodiments of the present application. Reference is now made to FIG. 2, which is a schematic illustration of an electrical circuits generated using this method, according to some embodiments of the present application.

As shown at 101, the electric diagrams are drafted according to precise standard guidelines, which comprise the displaying on the screen of a PC of the system control unit E1 at the centre of the work area A, or sheet; on the other hand, the additional devices B, (e.g. B1, M1, I1, R256, L268, I8, I393, I19, R45, R85, V6, V43, G1, T2, R47, P1, R76, M2, J1-J3, C1-C3, S265), connected to said control unit in a direct or indirect manner, are arranged in a satellite fashion around it.

As shown at 102, the diagram can consist of several sheets or folders and, if necessary, there is advantageously the use of particular interactive connections, or links, in the interface available to the user, which allow a faster and simpler navigation between the various sheets of the diagram.

As shown at 103, the drawings of the electric diagrams, displayed on the PC according to the invention, are grouped according to a well defined and standard level structure, where each level represents a device and contains a structure of sub-levels.

In particular, amongst the numerous levels used, there is the one dedicated to electric lines used for connecting devices together; this level is defined as "routing circuit".

As shown at 104, the routing circuit also contains a structure of sub-groups in which, depending on the requirements, it is possible to select and group together those electric lines which are to be highlighted with respect to others by means of a graphical animation of the interface.

Said animations can advantageously be executed by the user, who may trace them, with the use of a pointer, following the desired direction of the animation (for example, tracing a line from left to right in the interface will give the same direction to the animation).

The various lines contained in the routing circuit are differentiated by means of different colours and thicknesses of their lines; for example, some identifications are given in the following table.

---

Red line, thickness 1 pt: direct power supply from battery (which includes all the power supply lines which are always live)
Red line, thickness 0.5 pt: key-operated power supply (which includes all the power supply lines which are always live only after KEY-ON)
Green line, thickness 0.5 pt: 5-10 V power supply from the control unit
Black line, thickness 0.5 pt: earth
Purple line, thickness 0.5 pt: input signal to control unit
Blue line, thickness 0.5 pt: output signal from control unit
Yellow line, thickness 0.5 pt: undefined signal
Yellow line, thickness 1 pt: data line (for example, communication line K)
Orange line, thickness 2 pt: high voltage line (for example, switching ON coils command or electric motor lines)
Green line with black edge, thickness 2.5 pt: high speed CAN data line
Yellow line with black edge, thickness 2.5 pt: average speed CAN data line
Brown line with black edge, thickness 2.5 pt: low speed CAN data line
White line with black edge, thickness 2.5 pt: undefined speed CAN data line
White line with blue edge, thickness 2.5 pt: FlexRay data line The animations of the electric lines therefore allow their immediate identification and eliminate the typical difficulties of identifying and distinguishing them in diagrams with numerous devices and lines which connect them; for example, there can be a pulsing animation for data lines, consistent with the two-way nature of the signal conveyed by them.

The electric lines in the diagrams are also accompanied by a code which indicates the actual colour of the corresponding cable to be used; for example, the codes shown in the following table correspond to the acronyms of the relative colors.

| Acronym | Color |
| --- | --- |
| Bk | Black |
| Bl | Blue |
| Br | Brown |
| Ch | Chocolate |
| Db | Dark blue |
| Dg | Dark green |
| Gd | Dark grey |
| Gl | Light grey |
| Gr | Green |
| Gy | Grey |
| Lb | Light blue |
| Lg | Light green |
| N.D. | Not defined |
| Or | Orange |
| Pi | Pink |
| Pu | Purple |
| Re | Red |
| Ta | Light brown |
| Tr | Transparent |
| Wh | White |
| Ye | Yellow |

Once the drafting of the diagram has been completed, this can be advantageously converted into a different type file, for exporting and subsequent use on a platform or software different from the graphics processor on which it has been prepared. For example, it may be converted into an SVG type file and loaded on remote supports, such as, for example, servers, providing it with information concerning the contents of the diagram, such as, for example, the devices present, their location and the type of connector of the control unit.

This advantageously makes it available to all the users who request it or who must use it, in a simple and rapid manner, also by using software such as the known Internet browsers.

The invention is described by way of example only, without limiting the scope of application, according to its preferred embodiments, but it shall be understood that the invention may be modified and/or adapted by experts in the field without thereby departing from the scope of the inventive concept, as defined in the claims herein.

The invention claimed is:

1. Method for drafting and displaying electrical circuits based on libraries containing items or speech codes corresponding to the various types of electrical components, said items being made up of alphanumeric codes through which it is possible to unequivocally identify each single electrical component, characterized in that said method comprises the following steps:
   viewing on a PC screen a control unit of the electrical circuit in the middle of a work area;
   viewing on the PC screen further electrical components, connected directly or indirectly to said control unit using electric lines, around said control unit;
   grouping the views according to a level structure, where each level represents a component or device and contains a structure of sub-levels;
   setting and grouping electric lines of the electrical circuit which connect a plurality of components or devices and which have to be highlighted with respect to others, through graphic animations of the electric lines of the electrical circuit on the PC screen.

2. Method according to claim 1, characterized in that each electrical circuit comprises interactive links available to the user.

3. Method according to claim 1, characterized in that said animations are performed by the user, by means of a pointer, to trace a direction to be followed by the electric lines of the electrical circuit.

4. Method according to claim 1, characterized in that said electrical components and/or said electric lines are distinguishable by means of said animations with different colors and/or different thicknesses.

5. Method according to claim 1, characterized in that said animations of the electric lines are pulsed when said electric lines are constituted by data lines.

6. Method according to claim 1, characterized in that said electric lines are labeled by means of a code which shows a color of a corresponding cable to be used.

7. Method according to claim 1, characterized in that the electrical circuits which are shown on said PC screen are converted into a file for exporting and using said file on different software and/or on Internet browsers.

* * * * *